(12) United States Patent
Ju et al.

(10) Patent No.: US 6,959,435 B2
(45) Date of Patent: Oct. 25, 2005

(54) COMPILER-DIRECTED SPECULATIVE APPROACH TO RESOLVE PERFORMANCE-DEGRADING LONG LATENCY EVENTS IN AN APPLICATION

(75) Inventors: Dz-Ching Ju, Saratoga, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 09/968,261

(22) Filed: Sep. 28, 2001

(65) Prior Publication Data

US 2003/0074653 A1 Apr. 17, 2003

(51) Int. Cl.[7] .............................................. G06F 9/45
(52) U.S. Cl. .................. 717/158; 717/130; 717/131; 717/154; 712/207; 712/208
(58) Field of Search ............................. 717/154–157, 717/158, 130–131, 160, 127, 150, 159; 712/205–207, 208, 215

(56) References Cited

U.S. PATENT DOCUMENTS

| | | | | |
|---|---|---|---|---|
| 5,651,124 A | * | 7/1997 | Shen et al. | 712/215 |
| 5,704,053 A | * | 12/1997 | Santhanam | 717/158 |
| 5,751,945 A | * | 5/1998 | Levine et al. | 714/47 |
| 5,751,985 A | * | 5/1998 | Shen et al. | 712/218 |
| 5,854,934 A | * | 12/1998 | Hsu et al. | 717/161 |
| 5,909,567 A | * | 6/1999 | Novak et al. | 712/208 |
| 5,933,643 A | * | 8/1999 | Holler | 717/158 |
| 6,070,009 A | * | 5/2000 | Dean et al. | 717/130 |
| 6,421,826 B1 | * | 7/2002 | Kosche et al. | 717/161 |
| 6,560,693 B1 | * | 5/2003 | Puzak et al. | 712/207 |
| 6,567,975 B1 | * | 5/2003 | Damron | 717/155 |
| 6,675,374 B2 | * | 1/2004 | Pieper et al. | 717/141 |
| 6,681,387 B1 | * | 1/2004 | Hwu et al. | 717/158 |

OTHER PUBLICATIONS

TITLE: Load Execution Latency Reduction, author: Black et al, ACM, 1998.*
TITLE: Tolerating Memory Latency through SoftwareControlled Pre–Execution in Simultaneous Multithreading Processors, author: Luk, IEEE, May 2001.*
TITLE: Improving Balanced Scheduling with Compiler Optimizations that Increase Instruction–Level Parallelism, author: Lo et al, ACM, 1995.*
Craig B. Zilles et al., Understanding the Backward Slices of Performance Degrading Instructions, Article, Jun. 12–14, 2000, 10 pages, Proceedings of the 27th Annual International Symposium on Computer Architecture (ISCA–2000).
Jamison D. Collins et al., Speculative Precomputation: Long–range Prefetching of Delinquent Loads, Article, Jul. 2001, pp. 14–25, Proceedings of the 28th Annual International Symposium on Computer Architecture.

* cited by examiner

Primary Examiner—Chameli C. Das
(74) Attorney, Agent, or Firm—Blakely, Sokoloff, Taylor & Zafman LLP

(57) ABSTRACT

A compiler-directed speculative approach to resolve performance-degrading long latency events in an application is described. One or more performance-degrading instructions are identified from multiple instructions to be executed in a program. A set of instructions prefetching the performance-degrading instruction is defined within the program. Finally, at least one speculative bit of each instruction of the identified set of instructions is marked to indicate a predetermined execution of the instruction.

24 Claims, 3 Drawing Sheets

COMPILER-DIRECTED SPECULATIVE APPROACH TO RESOLVE PERFORMANCE-DEGRADING LONG LATENCY EVENTS IN AN APPLICATION

FIELD OF THE INVENTION

The present invention relates generally to computer systems and, more particularly, to a compiler-directed speculative approach to resolve performance-degrading long latency events in an application.

BACKGROUND OF THE INVENTION

The performance of a computer program is usually difficult to characterize. Programs do not perform uniformly well or uniformly poorly. Rather, programs have stretches of adequate performance punctuated by performance-degrading events. The overall observed performance of a specific program depends on the frequency of such events and their relationship to one another and to the rest of the program.

Program performance is measured by retirement throughput. Since retirement throughput is sequential, the presence of a performance-degrading event, such as a long latency instruction, blocks retirement and degrades performance. Some examples of performance-degrading long latency instructions include branch mispredictions and instruction and data cache misses.

Several solutions have been proposed to reduce the frequency and observed latency of these performance-degrading events. For example, one solution focuses on running a subset of the instructions that feed to the performance-degrading events ahead of the general execution of the program in order to resolve the performance-degrading events, by detecting the outcomes of branches and prefetching the needed data into the cache. This approach can improve performance only if one can identify a small subset of the program that can be issued sufficiently early to resolve the events with enough accuracy. This approach also requires additional hardware, for example a separate pipeline that would allow the identified subset to run ahead. However, identification of a minimal program subset with maximum accuracy requires a sophisticated program analysis and the hardware is typically constrained by a limited program scope and the simplicity of attainable analysis.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

Figure 1:
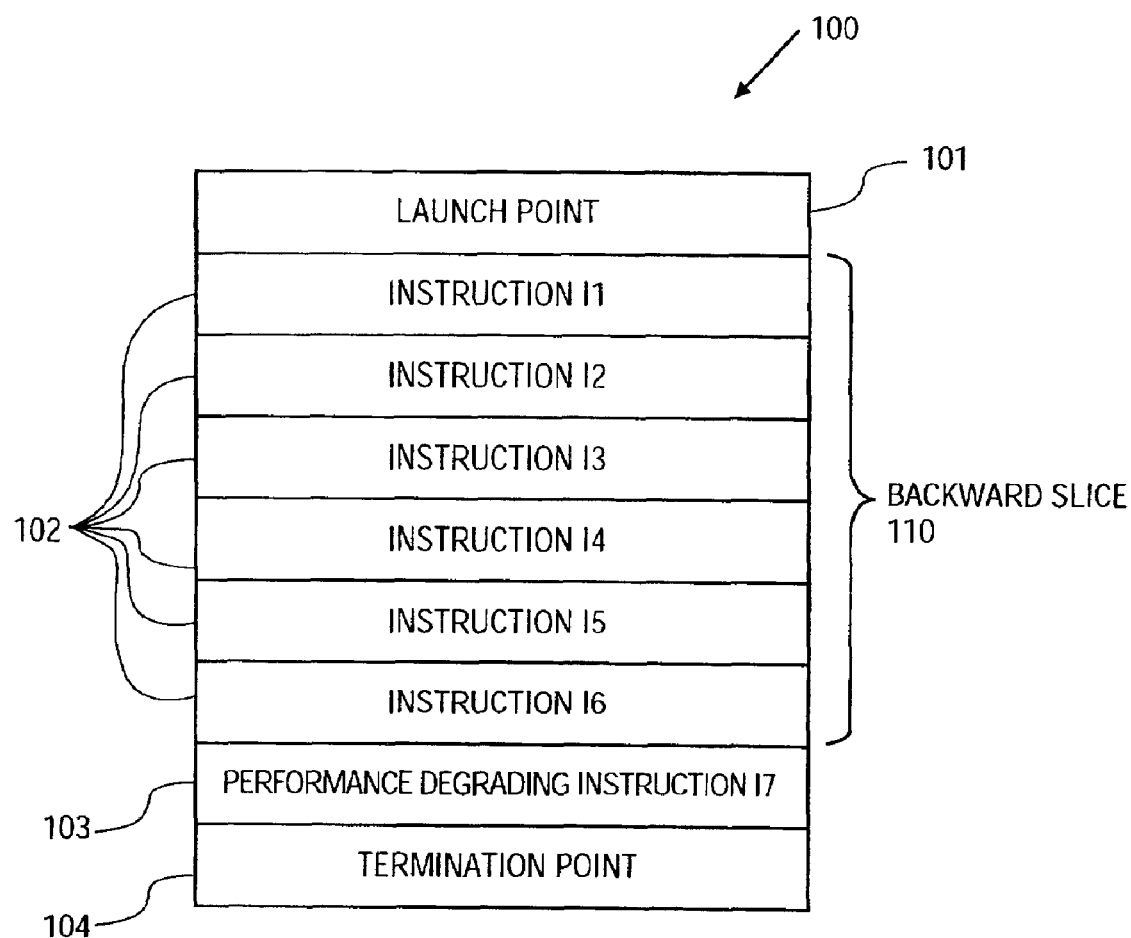
FIG. 1 illustrates a code region in a program, which includes at least one performance-degrading instruction.

A compiler-directed speculative approach to resolve performance-degrading long latency events in an application is described. In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Some portions of the detailed description are presented in terms of algorithms and symbolic representations of operations on data bits within a computer memory. These algorithmic descriptions and representations are the means used by those skilled in the data processing arts to most effectively convey the substance of their work. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the present invention discussions utilizing terms such as "processing," or "computing," or "calculating," or "determining," or "displaying," or the like, may refer to the action and processes of a computer system, or similar electronic computing device, that manipulates and transforms data represented as physical (electronic) quantities within the computer system's registers and memories into other data similarly represented as physical quantities within the system's registers or memories or other such information storage, transmission, or display devices.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information. While embodiments of the present invention will be described with reference to the Internet and the World Wide Web, the system and method described herein is equally applicable to other network infrastructures or other data communication systems.

The method and system of the present invention provide a compiler-directed speculative approach to resolve performance-degrading long latency events in an application. In one embodiment, at least one performance-degrading instruction is identified from multiple instructions to be executed in a program. A set of instructions preceding the performance-degrading instruction is defined within the program. Finally, at least one speculative bit of each instruction of the identified set of instructions is marked to indicate a predetermined execution of the instruction.

FIG. 1 illustrates a code region in a program, which includes at least one performance-degrading instruction. As shown in FIG. 1, a performance-degrading instruction (I7) 103 within the code region 100 is preceded by a set of instructions identified as a backward slice 110, which contains multiple instructions (I1–I6) 102. The backward slice 110 of the instruction 103 is the set of instructions that affects whether the instruction 103 will be executed or not and if so what value and side effect it will generate. A backward slice may or may not extend beyond a function boundary depending on where the slice boundary point is set, where the slice and the main instruction stream implicitly synchronize. In one embodiment, the execution of the backward slice is identified as the "speculative execution" and the execution of the normal program is identified as the "main execution."

In one embodiment, the code region 100 further includes a launch point 101, which is the instruction that launches the execution of the backward slice 110, and a termination point 104, which is the instruction that terminates the execution of the backward slice 110. The performance-degrading instruction 103 that causes frequent branch mispredictions or cache misses is identified through one of many known profile feedback or heuristic methods.

Figure 2:
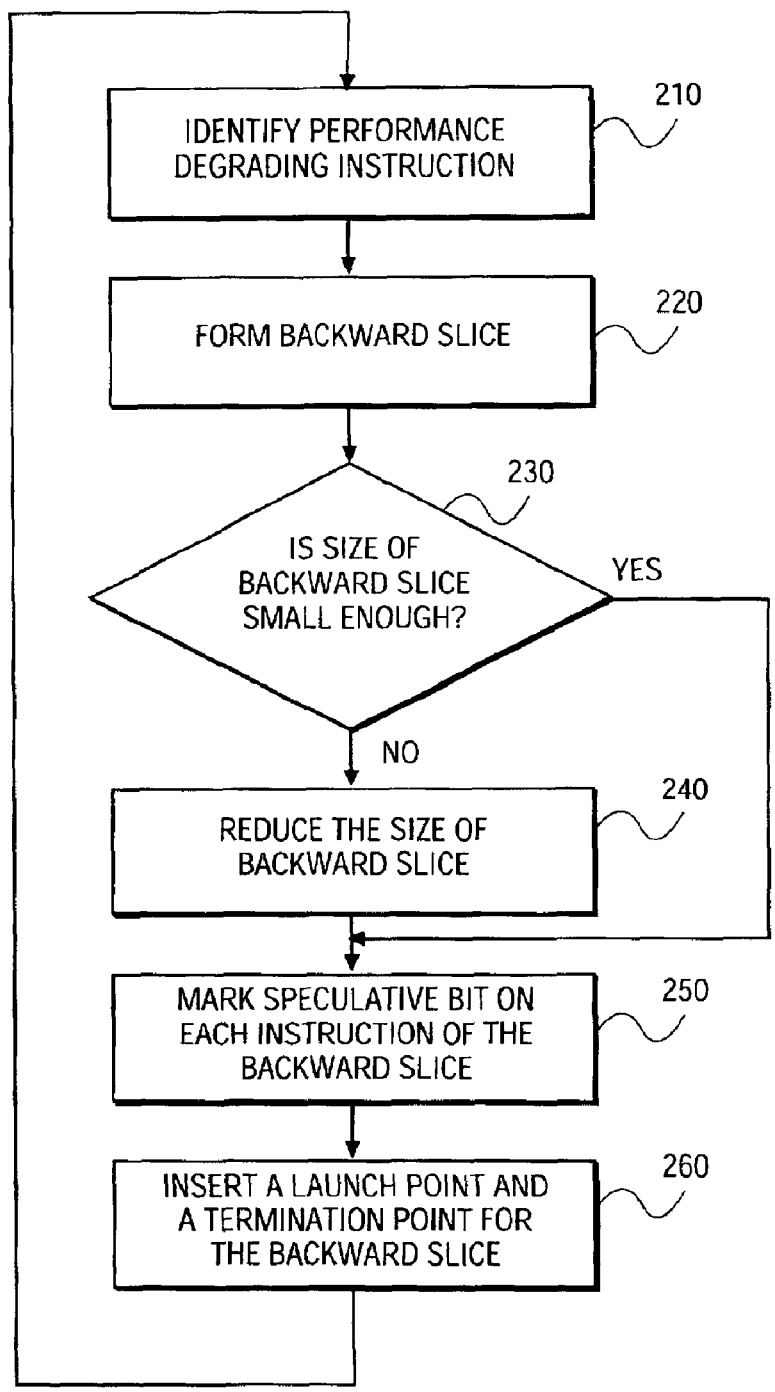
FIG. 2 is a flow diagram of one embodiment of a method to resolve performance-degrading long latency events.

FIG. 2 is a flow diagram of one embodiment of a method to resolve performance-degrading long latency events. As illustrated in FIG. 2, at processing block 210, a performance-degrading instruction 103 is identified using one of many known identification methods.

At processing block 220, the backward slice 110 corresponding to the performance-degrading instruction 103 is formed. In one embodiment, a compiler can apply one of many known inter-procedural methods to form backward slices across the function boundary. For example, each backward slice 110 has a set of live-in variables and a set of live-in memory locations. In order to form backward slices across the function boundary, each backward slice remembers function parameters and the memory live-in locations that it depends on when it reaches the function entry point. When the caller function is compiled, the backward slice 110 is extended at the call site along the instructions that define the function parameters and the memory live-in locations.

At processing block 230, a decision is made whether the size of the backward slice 110 is small enough to allow it to be pre-executed sufficiently early to resolve the performance-degrading instruction 103. If the size of the backward slice 110 is sufficiently small, then the process jumps to processing block 250. Otherwise, at processing block 240, the size of the backward slice 110 is reduced according to known speculation and prediction techniques that are described in detail below.

One example of a code region 100, according to the present invention, is illustrated in Table 1.

TABLE 1

(a) The original program foo(x, d)
{
I1:         ld e = [d]

TABLE 1-continued

I2:         add a = c, d
I3:         add b = e, 16
I4:         st [b] = a
I5:         ld y = [x]
I6:         add z = y, 8
I7:         ld = [z]
}

(b) Backward slice for I7

I1:         ld e = [d]
I2:         add a = c, d
I3:         add b = e, 16
I4:         st [b] = a
I5:         ld y = [x]
I6:         add z = y, 8
I7:         ld = [z]

(c) Reduced backward slice for I7

I5:         ld y = [x]
I6:         add z = y, 8
I7:         ld = [z]

(d) Launch and termination of backward slice foo(x, d)
{
?           launch I5
I1:         ld e = [d]
I2:         add a = c, d
I3:         add b = e, 16
I4:         st [b] = a
I5:*        ld y = [x]
I6:*        add z = y, 8
I7:*        ld = [z]
?           terminate
}

Table 1(a) shows the original code region 100. It is assumed that instruction I7 causes frequent data cache misses and is a performance-degrading instruction. Also, it is assumed that the store instruction at I4 may alias with the load instruction at I5. According to the above backward slice definition having a slice boundary point at the function entry, all of the instructions in this function, I1 through I7, are part of the backward slice for I7, as shown in Table 1(b). It is often the case that a backward slice based on the traditional definition is a significant part of the main instruction stream, and hence the slice may not be pre-executed sufficiently early to resolve the performance-degrading instruction I7. In one embodiment, the marker symbol "*" shown in Table 1(d) is used to indicate that the instruction is executed in both the speculative and main executions. The marker symbol "?" is used to indicate that the instruction is executed only in the speculative execution. Further, an instruction with no marker symbol is executed only in the main execution.

One example of a speculation technique is memory speculation. If the chance of the store instruction I4 to alias with the load instruction I5 and the performance-degrading instruction I7 is small, the instruction I4 could be excluded at the time of the backward slice formation for the instruction I7. At the same time, instructions I1 through I3 can also be excluded from the slice, as shown in Table 1(c). With the reduced backward slice shown in Table 1(c), a compiler may invoke the backward slice at an early launch point, for example at the beginning of the function, as illustrated in Table 1(d). A speculative thread can skip other instructions and execute only the instructions on the backward slice ahead of the general execution to prefetch the data required for the performance-degrading instruction I7 into a data cache.

Another example of a speculation technique is data speculation. Data speculation can be utilized to make a copy of the load instructions and their uses early in a backward slice as advanced loads. The recovery code for each advanced load instruction can be used to adjust the mistake made for the speculative execution. The advanced load and check will be marked by "?" to be executed only by the speculative execution. Table 2 shows an example of the application of data speculation to the reduction of the backward slice.

TABLE 2

(a) The original program

```
foo(x, d)
{
I1:         ld e = [d]
I2:         add a = c, d
I3:         add b = e, 16
I4:         st [b] = a
I5:         ld y = [x]
I6:         ld = [y]
}
```

(b) Launch and termination of backward slice using data speculation

```
foo(x, d)
{
?           launch I4
I1:         ld e = [d]
I2:         add a = c, d
I3:         add b = e, 16
I4:?        ld.a y = [x]
I5:?        ld = [y]
I6:*        st [b] = a
I7:?        ld.c y = [x]
I8:?        ld = [y]
I9:?        terminate
I10:        ld y = [x]
I11:        ld = [y]
}
```

Table 2(a) shows the original code region 100. In Table 2(b), the instruction I4 performs an advanced load by ignoring the memory dependence from the store instruction at I6. The instruction I5 then loads the value from the memory location y. Once the speculative thread performs the critical load, it then executes the store instruction and checks whether it is necessary to reload again the value from the memory location y.

A further example of a speculation technique is value speculation. Value speculation may specify the most likely value for an instruction so to break the dependence of the backward slice on earlier instructions. The assignment of the special value will be marked by "?" to be executed only by the speculative execution. Table 3 shows an example of the application of value speculation to the reduction of the backward slice.

TABLE 3

(a) The original program

```
foo(x, d)
{
I1:         ld e = [d]
I2:         add a = c, d
I3:         add b = e, 16
I4:         st [b] = a
I5:         ld y = [x]
I6:         add z = y, 8
I7:         ld = [z]
}
```

(b) Launch and termination of backward slice using value speculation

```
foo(x, d)
{
```

TABLE 3-continued

```
?           launch I7
I1:         ld e = [d]
I2:         add a = c, d
I3:         add b = e, 16
I4:         st [b] = a
I5:         ld y = [x]
I6:         add z = y, 8
I7:?        add z = 0x10000000, 8
I8:*        ld = [z]
?           terminate
}
```

Table 3(a) shows the original code region 100. It is assumed that through a hardware or software mechanism, the compiler predicts that the value being loaded at the load instruction I5 is frequently 0x10000000. Hence, in the speculative thread, the compiler-generated code can quickly generate the address using the predicted value to load from a memory location z.

An example of a prediction technique is branch prediction. Table 4 shows an example of the application of branch prediction to the reduction of the backward slice.

TABLE 4

(a) The original program

```
foo(x, d)
{
I1:         ld e = [d]
I2:         add a = c, d
I3:         add b = e, 16
I4:         cmp.eq p = c, 0
I5:         (p) br I9
I6:         st [b] = a
I7:         ld z = [x]
I8:         br I1 1
I9:         ld y = [x]
I10:        add z = y, 8
I11:        ld = [z]
}
```

(b) Launch and termination of backward slice using branch prediction

```
foo(x, d)
{
?           launch I12
I1:         ld e = [d]
I2:         add a = c, d
I3:         add b = e, 16
I4:         cmp.eq p = c, 0
I5:         (p) br I9
I6:         st [b] = a
I7:         ld z = [x]
I8:         br I1 1
I9:*        ld y = [x]
I10:*       add z = y, 8
I11:*       ld = [z]
?           terminate
}
```

Branch prediction is useful to force a backward slice progress along a predetermined path. The input to the comparison for a speculative branch may be incorrect and the execution may go to a wrong direction without branch prediction. In Table 4, a straightforward backward slice will include the control flow branch instruction and the instructions on both "taken" and "not-taken" paths. If the compiler can obtain the way in which the branch is likely to go, either through a software or through a hardware mechanism, it can perform a branch prediction at the compilation time. If it is assumed that the prediction favors the "taken" path, the backward slice 110 can be reduced to the instructions existent on the "taken" path.

Referring back to FIG. 2, at processing block 250, after reduction of the backward slice 110, one or more speculative bits on each instruction of the backward slice 110 is marked. In one embodiment, the marker symbol "*" is used to indicate that the instruction is executed in both the speculative and main executions. The marker symbol "?" is used to indicate that the instruction is executed only in the speculative execution. Further, an instruction with no marker symbol is executed only in the main execution.

Finally, at processing block 260, a launch point 101 and a termination point 104 are inserted for the backward slice 110 within the code region 100. In one embodiment, the speculative backward slices 110 must be issued sufficiently early to resolve the performance-degrading long latency instructions 103. However, issuing the backward slices too early could lead to the loss of the prefetch effect. For example, the data that is prefetched by a backward slice issued too early may be evicted from the data cache before its use. A compiler can use known program analysis techniques with aid from dynamic feedback information to decide where to insert the launch and termination points 101 and 104, respectively.

A backward slice 110 may have multiple launch points 101, which may be in a different function than the backward slice. An optimal launch point 101 for the backward slice 110 is a program point that satisfies the following conditions:

1. The launch point is earlier than the first instruction of the backward slice;
2. All live-in variables of the backward slice are ready at the launch point; and
3. The latency from the launch point to the performance-degrading instruction is greater than the total latency of the backward slice including the miss latency of the performance-degrading instruction.

To identify the launch point 101, the program is traversed backward, starting from the first instruction 102 of the backward slice 110. The backward traversal may encounter a joint point with multiple predecessors. The backward traversal needs to continue along all the highly probable predecessors using branch frequency information. Each instruction that changes the live-in value of the backward slice 110 will be scheduled earlier using known data and control speculation techniques. A launch point 101 is identified when the latency condition is satisfied and all live-in variables are ready. If an instruction is reached that changes the live-in value of the backward slice 110 and it cannot be scheduled earlier, and the latency condition is not satisfied, a sub-optimal launch point is identified. A sub-optimal launch point may be used if its latency can hide the majority of the miss latency of the performance-degrading instruction. If the backward traversal reaches the function entry and all live-ins are ready, but the latency condition is still not satisfied, the backward slice 110 is marked as incomplete and the list of live-ins are stored. In order to form backward slices across the function boundary, each backward slice 110 remembers function parameters and the memory live-in locations that it depends on when it reaches the function entry point. When the caller function is compiled, the backward slice 110 is extended at the call site along the instructions that define the function parameters and the memory live-in locations.

As illustrated in FIG. 2, processing blocks 210 through 260 are subsequently repeated for another performance-degrading instruction 103 within the code region 100.

Figure 3:
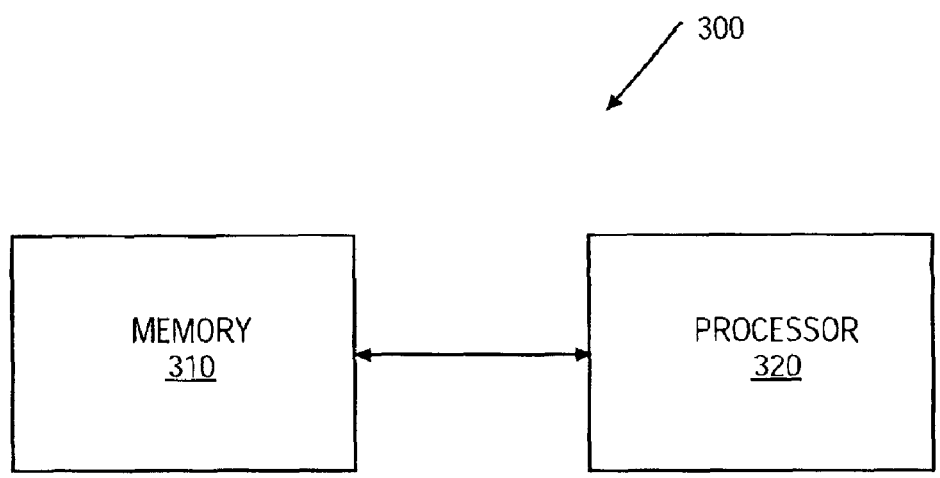
FIG. 3 is a block diagram of a processing system in accordance with one embodiment of the invention.

FIG. 3 is a block diagram of a processing system in accordance with one embodiment of the invention. As illustrated in FIG. 3, processing system 300 includes a memory 310 and a processor 320 coupled to the memory 310. In some embodiments, the processor 320 is a processor capable of compiling software and annotating code regions of the program. Processor 320 can be any type of processor capable of executing software, such as a microprocessor, digital signal processor, microcontroller, or the like. The processing system 300 can be a personal computer (PC), mainframe, handheld device, portable computer, set-top box, or any other system that includes software.

Memory 310 can be a hard disk, a floppy disk, random access memory (RAM), read only memory (ROM), flash memory, or any other type of machine medium readable by the processor 320. Memory 310 can store instructions for performing the execution of the various method embodiments of the present invention.

Figure 4:
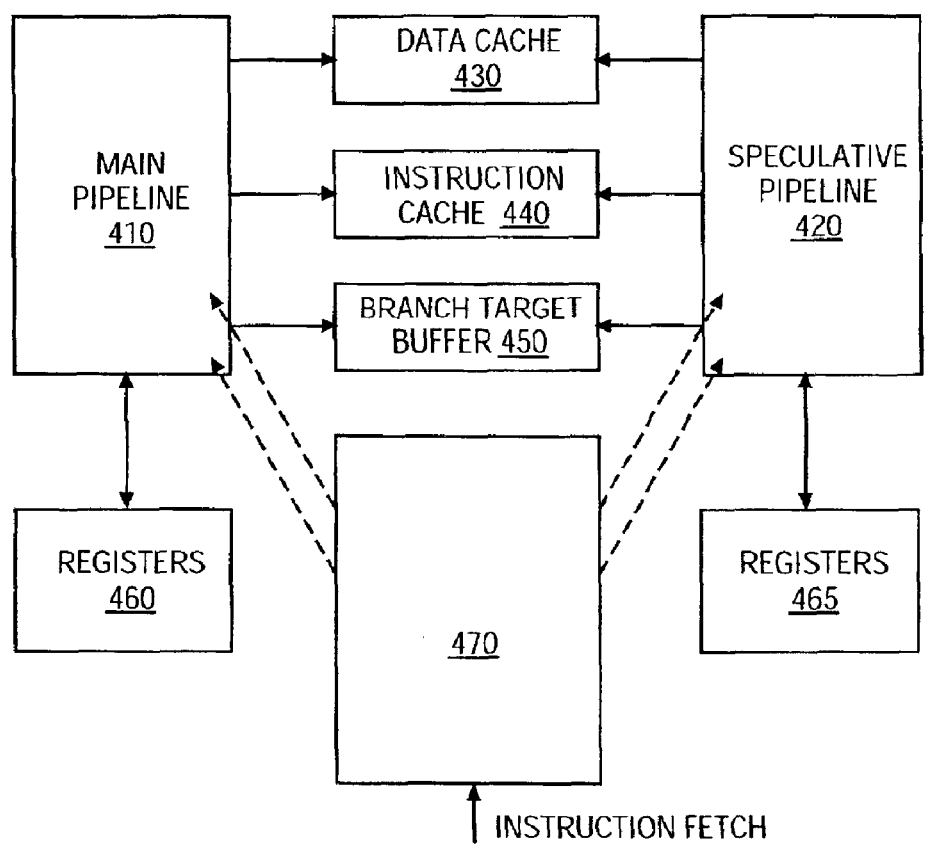
FIG. 4 is a detailed block diagram of the processing system.

FIG. 4 is a detailed block diagram of the processing system. As illustrated in FIG. 4, in one embodiment, a main pipeline 410 and a speculative pipeline 420 within the processor 320 share a data cache 430 and an instruction cache 440 located within memory 310, as well as a branch target buffer 450. This sharing arrangement allows the speculative pipeline 420 to resolve cache misses and branch mispredictions for the main pipeline 410, as described in detail above.

The processor 320 needs to fetch instructions from the program 470 in a high bandwidth manner and skip those instructions that are not part of slices in order to achieve the run-ahead effect. Instructions marked with the marker symbol "*" will be executed in both the main pipeline 410 and the speculative pipeline 420. Instructions marked with a marker symbol "?" will only be executed in the speculative pipeline 420. Finally, instructions having no marker symbol will be executed only in the main pipeline 410. The launch point instruction to launch the execution of the backward slice and the termination point instruction to terminate the execution of the backward slice will only be executed in the speculative pipeline 420.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   identifying at least one performance-degrading instruction from a plurality of instructions to be executed in a program;
   defining a set of instructions within said program to prefetch said at least one performance-degrading instruction;
   marking at least one speculative bit of each instruction of said set of instructions to indicate a predetermined execution of said each instruction; and
   inserting a launch point to launch said predetermined execution, said inserting further comprising:
      determining a first instruction of said set of instructions;
      determining whether variables of said set of instructions are ready for execution; and
      determining whether a latency value from said launch point to said performance-degrading instruction is greater than a total latency value of said set of instructions including a miss latency of said performance-degrading instruction.

2. The method according to claim 1, further comprising:
inserting a termination point to terminate said predetermined execution.

3. The method according to claim 2, wherein inserting said termination point further comprises:
marking said termination point subsequent to said performance-degrading instruction.

4. The method according to claim 1, wherein said identifying further comprises:
monitoring execution of said plurality of instructions; and
detecting said at least one performance-degrading instruction.

5. The method according to claim 1, wherein said defining further comprises:
reducing a size of said set of instructions based on speculation and prediction techniques.

6. The method according to claim 5, wherein said reducing further comprises:
determining whether a first instruction of said set of instructions is aliased with a second instruction within said set of instructions; and
removing said first instruction and adjacent instructions related to said first instruction from said set, if said first instruction is not aliased with said second instruction.

7. A system comprising:
means for identifying at least one performance-degrading instruction from a plurality of instructions to be executed in a program;
means for defining a set of instructions within said program to prefetch said at least one performance-degrading instruction;
means for marking at least one speculative bit of each instruction of said set of instructions to indicate a predetermined execution of said each instruction; and
means for inserting a launch point to launch said predetermined execution, said means for inserting further comprising:
means for determining a first instruction of said set of instructions;
means for determining whether variables of said set of instructions are ready for execution; and
means for determining whether a latency value from said launch point to said performance-degrading instruction is greater than a total latency value of said set at instructions including a miss latency of said performance-degrading instruction.

8. The system according to claim 7, further comprising:
means for inserting a termination point to terminate said predetermined execution.

9. The system according to claim 8, further comprising:
means for marking said termination point subsequent to said performance-degrading instruction.

10. The system according to claim 7, further comprising:
means for monitoring execution of said plurality of instructions; and
means for detecting said at least one performance-degrading instruction.

11. The system according to claim 7, further comprising:
means for reducing a size of said set of instructions based on speculation and prediction techniques.

12. The system according to claim 11, further comprising:
means for determining whether a first instruction of said set of instructions is aliased with a second instruction within said set of instructions; and
means for removing said first instruction and adjacent instructions related to said first instruction from said set, if said first instruction is not aliased with said second instruction.

13. A computer readable medium containing executable instructions, which, when executed in a processing system, cause said processing system to perform a method comprising:
identifying at least one performance-degrading instruction from a plurality of instructions to be executed in a program;
defining a set of instructions within said program to prefetch said at least one performance-degrading instruction;
marking at least one speculative bit of each instruction of said set of instructions to indicate a predetermined execution of said each instruction; and
inserting a launch point to launch said predetermined execution, said inserting further comprising:
determining a first instruction of said set of instructions;
determining whether variables of said set of instructions are ready for execution; and
determining whether a latency value from said launch point to said performance-degrading instruction is greater than a total latency value of said set of instructions including a miss latency of said performance-degrading instruction.

14. The computer readable medium according to claim 13, wherein said method further comprises:
inserting a termination point to terminate said predetermined execution.

15. The computer readable medium according to claim 14, wherein inserting said termination point further comprises:
marking said termination point subsequent to said performance-degrading instruction.

16. The computer readable medium according to claim 13, wherein said identifying further comprises:
monitoring execution of said plurality of instructions; and
detecting said at least one performance-degrading instruction.

17. The computer readable medium according to claim 13, wherein said defining further comprises:
reducing a size of said set of instructions based on speculation and prediction techniques.

18. The computer readable medium according to claim 17, wherein said reducing further comprises:
determining whether a first instruction of said set of instructions is aliased with a second instruction within said set of instructions; and
removing said first instruction and adjacent instructions related to said first instruction from said set, if said first instruction is not aliased with said second instruction.

19. A system comprising:
a memory to store a plurality of instructions to be executed in a program; and
a processor coupled to said memory to:
identify at least one performance-degrading instruction from said plurality of instructions;
define a set of instructions within said program to prefetch said at least one performance-degrading instruction;
mark at least one speculative bit of each instruction of said set of instructions to indicate a predetermined execution of said each instruction; and insert a launch point to launch said predetermined execution, wherein to insert a launch point further comprises said processor to:
 determine a first instruction of said set of instructions;
 determine whether variables of said set of instructions are ready for execution; and
 determine whether a latency value from said launch point to said at least one performance-degrading instruction is greater than a total latency value of said set of instructions including a miss latency of said performance-degrading instruction.

20. The system according to claim 19, wherein said processor further inserts a termination point to terminate said predetermined execution.

21. The system according to claim 20, wherein said processor further marks said termination point subsequent to said performance-degrading instruction.

22. The system according to claim 19, wherein said processor further monitors execution of said plurality of instructions and detects said at least one performance-degrading instruction.

23. The system according to claim 19, wherein said processor further reduces a size of said set of instructions based on speculation and prediction techniques.

24. The system according to claim 23, wherein said processor further:
 determines whether a first instruction of said set of instructions is aliased with a second instruction within said set of instructions; and
 removes said first instruction and adjacent instructions related to said first instruction from said set, if said first instruction is not aliased with said second instruction.

* * * * *